Figure 5:

J. B. Bellemere.
Lathe for Dressing Bolt-Heads.
Nº 1,342.   Patented Sept. 25, 1839.
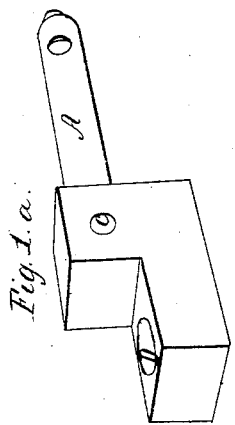
Fig. 1.a.
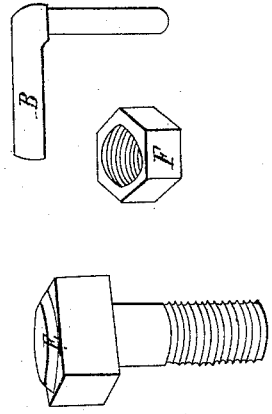
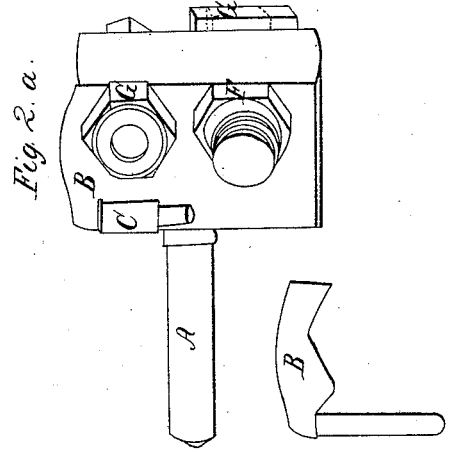
Fig. 2.a.
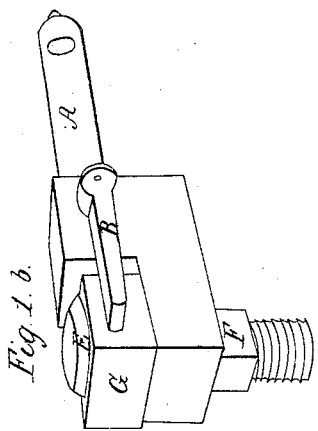
Fig. 1.b.
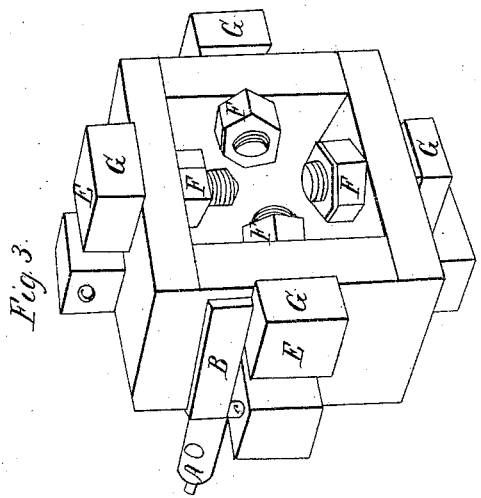
Fig. 3.
Inventor;
J. B. Bellemere

J. B. Bellemere.

Lathe for Dressing Bolt-Heads.

Nº 1,342.  Patented Sept. 25, 1839.

Inventor;
J. B. Bellemere

UNITED STATES PATENT OFFICE.

JOHN B. BELLEMERE, OF PHILADELPHIA, PENNSYLVANIA.

MODE OF SQUARING AND FINISHING THE HEADS OF BOLTS, NUTS, AND OTHER PLAIN SIMILAR SURFACES.

Specification of Letters Patent No. 1,342, dated September 25, 1839.

*To all whom it may concern:*

Be it known that I, JOHN B. BELLEMERE, of Philadelphia, in the county of Philadelphia and State of Pennsylvania, have invented a new and improved mode of squaring and finishing the heads of bolts, nuts, and all other plain surfaces similar to the heads of bolts or nuts with four, six, or more squares or sides, for the use of all kinds of machinery of anything in which bolts or nuts with heads of four or more sides are used; and I hereby declare that the following is an exact description of the same.

My invention consists of a chock or case, for confining the nut, or bolt head, or thing to be squared or finished, and for attaching it to a lathe, in order that the chisel for squaring or finishing may be applied to it; and also of a guide for directing the operator in making the surfaces to be squared and finished, level, or parallel with each other. This chock is of different forms, according to the number of bolts or nuts to be squared or finished upon the lathe at the same time; one form admitting one bolt or nut, another two, and another four or more; each of which forms is exhibited in the drawing hereto annexed, as part of this description.

Figure 1, *a*, is a chock of the first form, a square block of iron or other suitable material, at one end terminating in a square projection or smaller block, perforated with a hole D, for receiving the bolt of which the head is to be squared or finished, and at the other end terminating in a shank A for attaching it to a lathe. The block is perforated with a hole at right angles to the direction of the hole first mentioned, for inserting the shank of the guide. Fig. 1, *b* represents the chock of the first form with the bolt attached for squaring, A being the shank of the chock for attaching it to the lathe, B the guide, G the side of the bolt head on which the chisel is operating. E is the head surface of the bolt. F is a nut for confining the bolt to the chock.

Fig. 2 is a chock of the second form, for squaring or finishing two bolt heads or nuts. It is a square block of iron or other suitable material, perforated with two holes for receiving the bolts of which the heads are to be squared or finished, or to which the nuts to be squared or finished are to be attached, and with a ring attached to the side, for receiving the shank of the guide, and with a shank for attaching it to a lathe. A represents the shank for attaching it to the lathe, B the arm of the guide that passes over the squared or finished surface of the bolt head or nut, C the ring for receiving the shank of the guide. G is the surface of the bolt head, and F the surface of the nut, on which the chisel is to operate.

Fig. 3 is a chock of the third form, for squaring or finishing four bolt heads or nuts. It is a square box of iron or cloth or suitable material, terminating in a shank for attaching it to a lathe, each side perforated with a hole for receiving the bolt of which the head is to be squared or finished, and furnished also with a projection, perforated with a hole, for receiving the shank of the guide. In this figure, A is the shank for attaching the chock to the lathe, B the arm of the guide laid over the squared or finished surface of the bolt head or nut, C the hole in the projection for receiving the shank of the guide, E, the upper surface of the bolt head, F the nut for confining the bolt to the chock, G the side of the bolt head or nut on which the chisel is to operate. The guide is of different forms, according to the number of sides to be given to the bolt head or nut. It is a bar of iron or other suitable material, straight, as in the one attached to Figs. 1 2, for squaring bolt heads or nuts with four sides, or notched, as in the one attached to Fig. 2, for squaring bolt heads of six sides, and with an additional notch for additional sides; and at right angles to this bar is a shank for fitting it to the chock. The figure marked B, near Fig. 1ª is a guide for squaring four sides, the figure marked B, near Fig. 2, is a guide for squaring six sides; and B is the arm which passes over the squared surface, and the part at right angles to B is the shank. The small figure between Fig. 1ª and Fig. 2 marked F, is a nut for confining a bolt to the chock, and the other small figure near the bolt, marked E is a bolt.

In operating, the bolt or nut is screwed to the chock, and the chock is fitted to the main coil or spindle of a lathe; the guide is fitted to the chock by the shank, and the whole being turned by the lathe, the surface to be squared or finished is brought in contact with a chisel or cutting instrument.

Referring to the figures of the drawing annexed, I fit the chock to the spindle of the lathe, insert the shank of the bolt the head of which is to be squared or finished, in the hole D, and confine it with the small nut F; I insert the guide B, by its shank, in the hole G, and lay the arm of the guide O over the bolt head or nut to be squared or finished; then turning the lathe, I bring the chisel or cutting instrument in contact with the side G of the bolt head or nut, and cut it to the level required. I then place the finished side G under the arm B of the guide, and bring the right side of the bolt head or nut to be squared in contact with the chisel, and so on till all the sides of the bolt heads, or nuts, of whatever required number, be finished.

Figure 4:
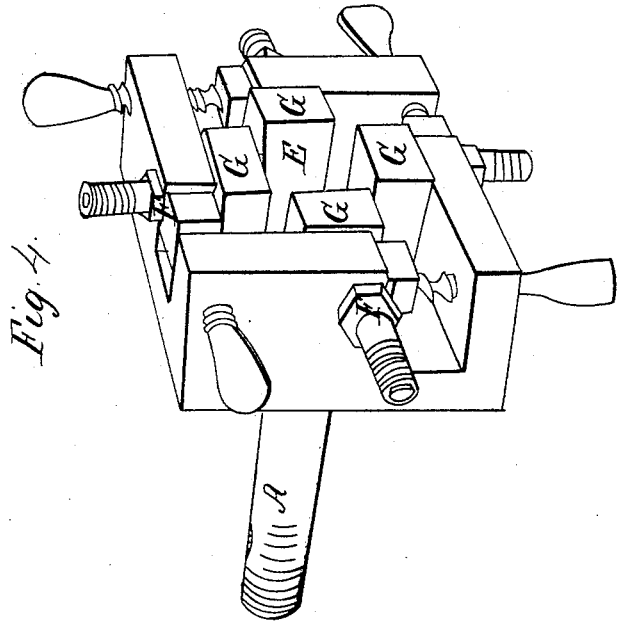

Other forms may be used for the chock, as that represented by Fig. 4 in the drawing annexed. In this the hole through which the stem of the bolt to be squared passes, is provided with a slot, to admit a screw passing through a hole in the adjoining side of the chock, at right angles to the stem of the bolt; and this screw, passing up on the stem of the bolt, confines it, or aids in confining it. In this form of chock, the guide may be of the form represented by Fig. 5 in the drawing annexed.

I do not claim the chock used by terming as my invention; but merely the improvement made thereon by me; that is to say,

I claim—

1. In so constructing or altering the chocks heretofore employed in the various forms above described, as to receive the shank or stem of the screw or bolt or nut, in a hole or holes at right angles to the axis of rotation of the chocks when attached to the mandrel of the lathe, as herein described.

2. And I also claim the guide in combination with the chock, as herein described.

3. And I also claim the combination of the combined chock and guide with the lathe, as herein described; all which combinations are for the purpose of squaring and finishing bolt heads, nuts, and things similar; and this invention I desire to secure by Letters Patent.

J. B. BELLEMERE.

Witnesses:
RUSSELL JARVIS,
MONT P. YOUNG.